United States Patent
Li et al.

(10) Patent No.: US 11,700,383 B2
(45) Date of Patent: *Jul. 11, 2023

(54) TECHNIQUES FOR MODELING TEMPORAL DISTORTIONS WHEN PREDICTING PERCEPTUAL VIDEO QUALITY

(71) Applicant: NETFLIX, INC., Los Gatos, CA (US)

(72) Inventors: Zhi Li, Mountain View, CA (US); Christos Bampis, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/141,081

(22) Filed: Jan. 4, 2021

(65) Prior Publication Data

US 2021/0127120 A1    Apr. 29, 2021

Related U.S. Application Data

(63) Continuation of application No. 15/890,709, filed on Feb. 7, 2018, now Pat. No. 10,887,602.

(51) Int. Cl.
*H04N 19/154* (2014.01)
*H04N 19/91* (2014.01)
(Continued)

(52) U.S. Cl.
CPC ....... *H04N 19/154* (2014.11); *G06F 18/2411* (2023.01); *G06N 3/045* (2023.01);
(Continued)

(58) Field of Classification Search
CPC ......... G06T 7/0002; G06T 2207/30168; G06T 2207/10016; G06V 10/993; G06V 20/40
See application file for complete search history.

(56) References Cited

U.S. PATENT DOCUMENTS 10,182,097 B2   1/2019  Bovik et al.
10,185,884 B2   1/2019  Kolarov et al.
(Continued)

FOREIGN PATENT DOCUMENTS

CN   102685493 A    9/2012
EP   2 114 078 A1   11/2009
(Continued)

OTHER PUBLICATIONS

Zhi Li, Anne Aaron, Ioannis Katsavounidis, Anush Moorthy and Megha Manohara, "Toward A Practical Perceptual Video Quality Metric," Jun. 6, 2016, Netflix Technology Blog. (Year: 2016).*
(Continued)

*Primary Examiner* — Ross Varndell
(74) *Attorney, Agent, or Firm* — Artegis Law Group, LLP

(57) ABSTRACT

In various embodiments, a prediction application computes a quality score for re-constructed visual content that is derived from visual content. The prediction application generates a frame difference matrix based on two frames included in the re-constructed video content. The prediction application then generates a first entropy matrix based on the frame difference matrix and a first scale. Subsequently, the prediction application computes a first value for a first temporal feature based on the first entropy matrix and a second entropy matrix associated with both the visual content and the first scale. The prediction application computes a quality score for the re-constructed video content based on the first value, a second value for a second temporal feature associated with a second scale, and a machine learning model that is trained using subjective quality scores. The quality score indicates a level of visual quality associated with streamed video content.

18 Claims, 5 Drawing Sheets

(51) Int. Cl.

| | | |
|---|---|---|
| *H04N 21/235* | (2011.01) | |
| *G06N 3/08* | (2023.01) | |
| *G06N 20/20* | (2019.01) | |
| *G06N 20/10* | (2019.01) | |
| *H04N 17/00* | (2006.01) | |
| *G06F 18/2411* | (2023.01) | |
| *G06N 3/045* | (2023.01) | |
| *G06N 5/01* | (2023.01) | |

(52) U.S. Cl.
 CPC .............. *G06N 3/08* (2013.01); *G06N 5/01* (2023.01); *G06N 20/10* (2019.01); *G06N 20/20* (2019.01); *H04N 17/004* (2013.01); *H04N 19/91* (2014.11); *H04N 21/235* (2013.01)

(56) References Cited

U.S. PATENT DOCUMENTS

| | | | |
|---|---|---|---|
| 2002/0090134 | A1 | 7/2002 | Van Zon |
| 2003/0144585 | A1 | 7/2003 | Kaurman et al. |
| 2013/0293725 | A1 | 11/2013 | Zhang et al. |
| 2014/0119432 | A1 | 5/2014 | Wang |
| 2015/0341667 | A1* | 11/2015 | Liao ................. H04L 65/80 375/240.27 |
| 2015/0373324 | A1 | 12/2015 | Liao et al. |
| 2016/0330439 | A1 | 11/2016 | Yu et al. |
| 2016/0335754 | A1* | 11/2016 | Aaron ............. H04N 21/4666 |
| 2017/0132785 | A1 | 5/2017 | Wshah et al. |
| 2017/0295374 | A1 | 10/2017 | Aaron et al. |
| 2018/0068195 | A1 | 3/2018 | Kolarov et al. |
| 2018/0286032 | A1* | 10/2018 | Bovik ................. G06T 7/0002 |

FOREIGN PATENT DOCUMENTS

| | | |
|---|---|---|
| WO | 2016/183011 A1 | 11/2016 |
| WO | 2016/197026 A1 | 12/2016 |

OTHER PUBLICATIONS

Bampis et al., "SpEED-QA: Spatial Efficient Entropic Differencing for Image and Video Quality", IEEE Signal Processing Letters, vol. 24, No. 9, Sep. 1, 2017, pp. 1333-1337.

Bampis et al., "Spatio Temporal Feature Integration and Model Fusion for Full Reference Video Quality Assessment", arxiv.org, Cornell University Library, Apr. 13, 2018, pp. 1-12.

Soundararajan et al., "Video Quality Assessment by Reduced Reference Spatio-Temporal Entropic Differencing", IEEE Transactions on Circuits and Systems for Video Technology, vol. 23, No. 4, Apr. 2013, pp. 684-694.

Moorthy et al., "Visual Importance Pooling for Image Quality Assessment", in IEEE Journal of Selected Topics in Signal Processing, vol. 3, No. 2, Apr. 2009, pp. 193-201.

Non Final Office Action received for U.S. Appl. No. 17/141,075 dated Jun. 22, 2022, 16 pages.

Chetouani et al., "A Universal Full Reference Image Quality Metric Based on a Neural Fusion Approach", Proceedings of 2010 IEEE 17th International Conference on image Processing, https://ieeexplore.ieee.org/document/5652855, Sep. 26-29, 2010, pp. 2517-2520.

Sugimoto et al., "Objective Perceptual Picture Quality Assessment Method for Multimedia Applications", The Institute of Electronics, Information and Communication Engineers, vol. J93-D No. 12, Dec. 1, 2010, pp. 2620-2632.

Final Office Action received for U.S. Appl. No. 17/141,075, dated Nov. 15, 2022, 17 pages.

Notice of Allowance received for U.S. Appl. No. 17/141,075, dated Mar. 24, 2023, 9 pages.

\* cited by examiner

TECHNIQUES FOR MODELING TEMPORAL DISTORTIONS WHEN PREDICTING PERCEPTUAL VIDEO QUALITY

CROSS-REFERENCE TO RELATED APPLICATIONS

This application is a continuation of the co-pending U.S. patent application titled, "TECHNIQUES FOR MODELING TEMPORAL DISTORTIONS WHEN PREDICTING PERCEPTUAL VIDEO QUALITY," filed on Feb. 7, 2018 and having Ser. No. 15/890,709. The subject matter of this related application is hereby incorporated herein by reference.

BACKGROUND OF THE INVENTION

Field of the Invention

Embodiments of the present invention relate generally to video technology and, more specifically, to techniques for modeling temporal distortions when predicting perceptual video quality.

Description of the Related Art

Efficiently and accurately encoding source video content is critical for real-time delivery of high-quality video content. Because of variations in encoded video content quality, it is desirable to implement quality controls to ensure that the visual quality of re-constructed video content decoded from the encoded source video content is acceptable. Manually verifying the visual quality of re-constructed video content is prohibitively time consuming. Accordingly, automated video content quality assessment is often an integral part of the encoding and streaming infrastructure. For example, automated video quality assessment can be employed when evaluating encoders and fine-tuning streaming bitrates to optimize streamed video content.

Some approaches to automatically assessing the quality of re-constructed video content involve computing a quality score based on a perceptual quality model that is trained based on human assessments of visual quality. In general, perceptual quality models associate values for features of re-constructed video content with different quality scores. One limitation of predicting the quality of re-constructed video content via a perceptual quality model is that perceptual quality models typically lack robustness. For example, if none of the features associated with a perceptual quality model reflect certain types of distortions, then the perceptual quality model is unable to accurately predict human perception of the quality of re-constructed video content that include such distortions.

In particular, perceptual quality models are typically unable to reliably predict the perceived visual quality of re-constructed video content included in the public-domain LIVE Video Quality Database. Analysis of the deficiencies of perceptual quality models with respect to the LIVE Video Quality Database indicate that none of the features associated with the perceptual quality model accurately model the perceived quality degradation attributable to many types of complex temporal video distortions. Examples of complex temporal video distortions include, without limitation, motion estimation mismatches, flicker, and ghosting.

As the foregoing illustrates, what is needed in the art are more effective techniques for predicting the perceived quality of re-constructed video content.

SUMMARY OF THE INVENTION

One embodiment of the present invention sets forth a computer-implemented method for predicting the perceived video quality of re-constructed video content. The method includes generating a frame difference matrix based on a first frame and a second frame that are included in re-constructed video content; computing a first entropy matrix based on the frame difference matrix and a first scale; computing a first value for a first temporal feature based on the first entropy matrix and a second entropy matrix associated with both video content from which the re-constructed video content is derived and the first scale; and computing a quality score for the re-constructed video content based on the first value, a second value for a second temporal feature associated with a second scale, and a machine learning model trained using a plurality of subjective quality scores, wherein the quality score indicates a level of visual quality associated with streamed video content.

At least one advantage of the disclosed techniques for predicting perceived video quality is that the quality score accurately predicts perceived video quality across a diverse range of re-constructed video content. In particular, at least one technological improvement relative to the prior art is that the disclosed techniques compute, at multiple scales, temporal entropy differences between the video content and the associated re-constructed video content. Because these type of computations emulate aspects of how the human visual system processes visual information, the corresponding temporal features accurately model perceived quality degradation attributable to many types of complex temporal video distortions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques efficiently and reliably predict quality scores for re-constructed video content via a perceptual quality model that associates values for features with a quality score. Notably, the perceptual quality model is associated with multiple temporal features, where each temporal feature is associated with a different scale. In operation, a temporal extractor computes per-frame values for a specific temporal feature based on re-constructed video content, the associated video content, and the scale associated with the temporal feature. For a given frame, the temporal extractor computes a frame difference matrix specifying differences in luminance between the frame and an adjacent frame. The temporal extractor then downsamples the frame difference matrix based on the scale to generate a scaled frame difference matrix. Subsequently, the temporal extractor performs temporal filtering operations and local mean-subtraction operations on the scaled frame difference matrix to compute a local mean-subtracted matrix. The temporal extractor then performs conditioning operations on the scaled frame difference matrix to generate a first weighted entropy matrix that is associated with the frame of the re-constructed video content.

In an analogous fashion, the temporal extractor derives a second weighted entropy matrix based on the video content and the scale. The temporal extractor performs subtraction operations between the first weighted entropy matrix and the second weighted entropy matrix to compute an entropy difference matrix. Finally, the temporal extractor performs spatial pooling operations on the entropy difference matrix to generate a single value for the temporal feature of the frame of the re-constructed video content. Because computing entropy difference matrices at multiple scales emulates aspects of how the human visual system processes visual information, the perceptual quality model accurately models perceived quality degradation attributable to many types of complex temporal video distortions.

In some embodiments, an ensemble prediction engine computes a ensemble quality score for re-constructed video content based on two perceptual quality models. Each of the perceptual quality models associates values for a different set of features with a different quality score. An ensemble prediction engine composites quality scores obtained via the two perceptual quality models to obtain an ensemble quality score.

Advantageously, distributing features between two prediction quality models decreases the likelihood that increasing the total number of features results in inaccuracies attributable to overfitting.

System Overview

Figure 1:
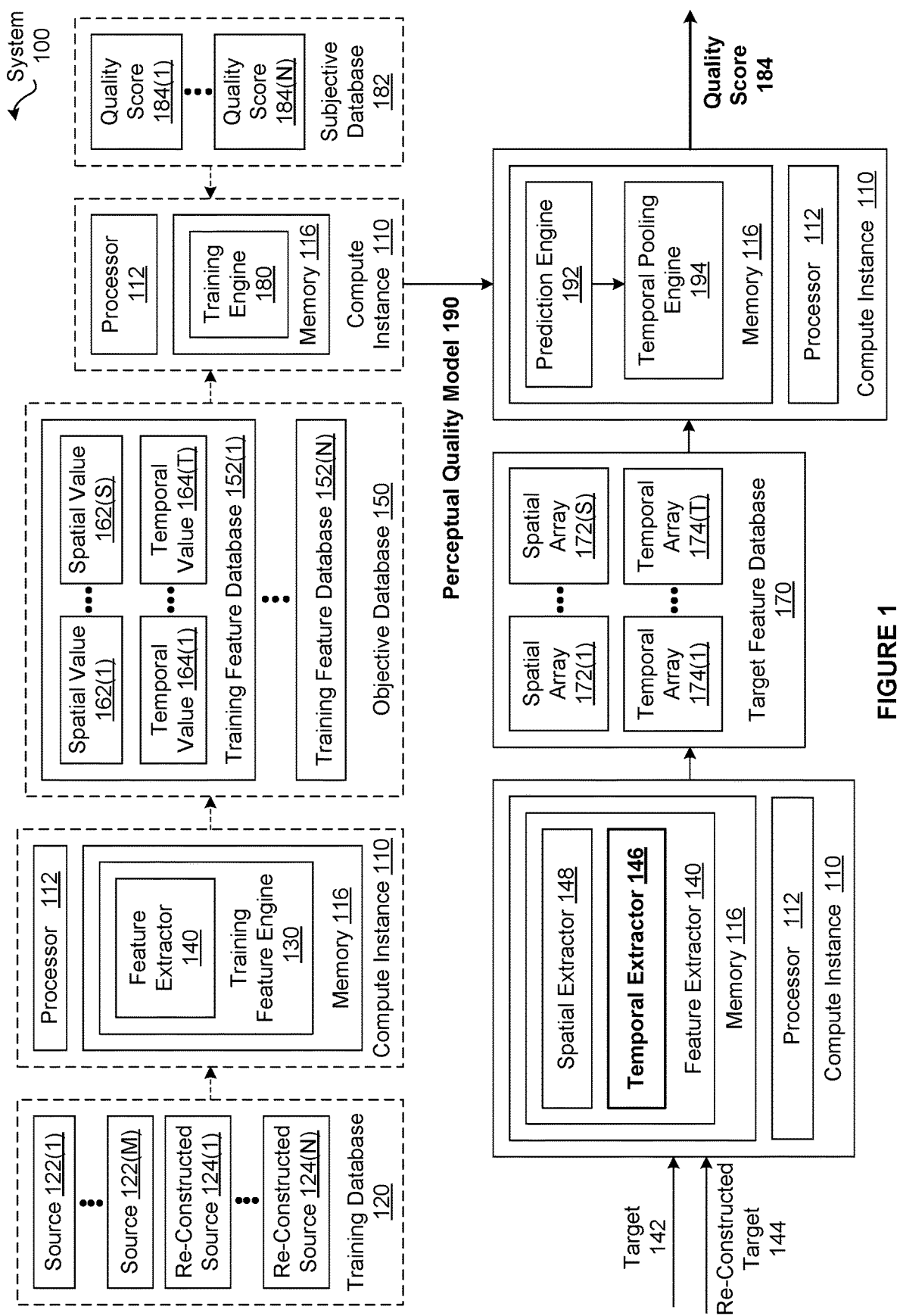
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of compute instances 110, a training database 120, an objective database 150, a subjective database 182, and a target feature database 170. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instances 110 are configured to provide automated video content quality assessment for re-constructed video content. The video content quality assessment may be used to implement quality controls associated with an encoding and streaming infrastructure. For example, to ensure an acceptable viewing experience, the quality of re-constructed video content and, indirectly, the caliber of the elements included in the encoding and streaming infrastructure are typically evaluated at various points in the design and delivery process based on visual quality scores. The visual quality scores are then used to guide the development of applications (e.g., encoders) and the real-time optimization of content delivery, such as stream-switching algorithms that are quality-aware.

As shown, a training feature engine 130, a training engine 180, a prediction engine 192, an instance of a feature extractor 140, and a temporal pooling engine 194 reside in the memory 116 and execute on the processor 112 of different compute instances 110. In alternate embodiments, any number of instances of the training feature engine 130, the training engine 180, the feature extractor 140, the prediction engine 192, the temporal pooling engine 194, the training feature engine 130, and the training engine 180 may reside in any number and types of memory and execute on any number and types of processing devices in any combination.

During a learning phase, depicted with dotted lines, the training feature engine 130 and the training engine 180 collaborate to generate a perceptual quality model 190. For re-constructed video content, the perceptual quality model 190 associates a set of values for a set of features with a quality score 184 that correlates to subjective human visual experience when viewing the re-constructed video content.

In operation, the training feature engine 130 acquires a training database 120 and generates the objective database 150. The training database 120 includes, without limitation, any number of sources 122, and any number of re-constructed sources 124. Each of the sources 122 includes, without limitation, any amount and type of video content. Examples of video content include, without limitation, any portion (including all) of feature length films, episodes of television programs, and music videos, to name a few. Each of the re-constructed sources 124 include, without limitation, re-constructed video content that is derived from the video content included in one of the sources 122.

As a general matter, each of the re-constructed sources 124 replicates the video content included in the associated source 122 as conveyed to a viewer via a streaming infrastructure and a display device. The re-constructed sources 124 may be derived from the sources 122 based on any number of encoding parameters and in any technically feasible fashion. For instance, in some embodiments, three different re-constructed sources 124 are derived from each of the sources 122. For each of three different sets of encoding parameters, an encoding engine (not shown in FIG. 1) independently encodes the source $122(x)$. For each of the three resulting encoded sources, a decoding engine (not shown in FIG. 1) independently decodes the encoded source to generate one of the re-constructed sources 124 derived from the sources $122(x)$.

As shown, the training feature engine 130 includes, without limitation, the feature extractor 140. The feature extractor 140 computes values for features. Each of the features is either a "spatial feature" that measures spatial video distortions or a "temporal feature" that measures temporal visual distortions. Examples of spatial video distortions include, without limitation, compression artifacts, scaling artifacts, and film grain noise. Examples of temporal video distortions include, without limitation, motion estimation mismatches, flicker, and ghosting.

The feature extractor 140 includes, without limitation, a spatial extractor 148 and a temporal extractor 146. For each re-constructed source $124(x)$ and each spatial feature, the spatial extractor 148 computes a spatial array $172(x)$ based on the re-constructed source $124(x)$ and, optionally, the source 122 associated with the re-constructed source $124(x)$. The spatial array $172(x)$ includes, without limitation, a different frame value for each frame included in the re-constructed source $124(x)$.

Similarly, for each re-constructed source $124(x)$ and each temporal feature, the temporal extractor 146 computes a temporal array $174(x)$ based on the re-constructed source $124(x)$ and the source 122 associated with the re-constructed source $124(x)$. The temporal array $174(x)$ includes, without limitation, a different frame pair value for each frame included in the re-constructed source $124(x)$. As referred to herein, a "frame pair" comprises two sequential frames, and the frame pair value is associated with the first of the two sequential frames. In alternate embodiments, the feature extractor 140 may compute any number of values for a particular feature of a particular re-constructed source 124 in any technically feasible fashion.

For each spatial feature and each re-constructed source $124(x)$, the training feature engine 130 performs temporal pooling operations on the spatial array $172(x)$ associated with the spatial feature to determine a spatial value 162 for the feature of the re-constructed source $124(x)$. The training feature engine 130 may perform any amount and type of temporal pooling operations in any technically feasible fashion. For instance, in some embodiments, the training feature engine 130 could set the spatial value 162 for a given spatial feature of the re-constructed source $124(x)$ equal to the average of the frame values included in the spatial array $172(x)$ associated with the feature. Similarly, for each temporal feature and each re-constructed source $124(x)$, the training feature engine 130 could perform set the temporal value 164 for a given temporal feature of the re-constructed source $124(x)$ equal to the average of the frame pair values included in the temporal array $174(x)$ associated with the feature.

For each of the re-constructed sources 124, the training feature engine 130 generates a training feature database 152 that includes, without limitation, the spatial values 162 and the temporal values 164 for the features of the re-constructed source 124. The training feature engine 130 then generates the objective database 150 that includes, without limitation, the training feature databases 152. Consequently, if the training database 120 includes N re-constructed sources 124, then the objective database 150 includes N training feature databases 152. Further, if the feature extractor 140 computes S spatial arrays 172 for S spatial features and T temporal arrays 174 for T temporal features, then each of the training feature databases 152 includes S spatial values 162 and T temporal values 164.

The training engine 180 generates the perceptual quality model 190 based on the objective database 150 and the subjective database 182. The subjective database 182 includes, without limitation, a quality score 184 of each of the re-constructed sources 142. The quality score $184(x)$ for the re-constructed source $142(x)$ is generated based on human viewings of the re-constructed source $142(x)$. More specifically, as viewers watch the re-constructed source $142(x)$ on display devices, the viewers personally rate the visual quality—assigning personalized scores. The personalized scores are then aggregated to generate the quality score $184(x)$.

The training engine 180 implements any number and type of machine learning algorithms in any technically feasible fashion to generate the perceptual quality model 190 based on the objective database 150 and the subjective database 182. Examples of machine learning algorithms include, without limitation, support vector machine algorithms, artificial neural network algorithms, and random forest algorithms, to name a few. In general, for each of the re-constructed sources $124(x)$, the perceptual quality model 190 is trained based on the association between the spatial values 162 and the temporal values 164 included in the objective database $150(x)$ and the quality score $184(x)$ included in the subjective database 182. In alternate embodiments, the training engine 180 may train the perceptual quality model 190 at any technically feasible level of granularity (e.g., based on associating frame values for the features with frame quality scores).

Notably, irrespective of the granularity at which the training engine 180 trains the perceptual quality model 190, the perceptual quality model 190 associates a set of values for the set of features at any given granularity to a score at the same granularity. More precisely, the perceptual quality model 190 associates a set of S values for the set of S spatial features and a set of T values for the set of T temporal features with a score that predicts an associated perceived visual quality. For example, the perceptual quality model 190 associates a set of S frame values for the spatial features of the first frame and a set of T frame pair values for the temporal features of the first frame to a frame score that represents the perceived visual quality of the first frame.

During a prediction phase, depicted with solid lines, the feature extractor 140, the prediction engine 192, and the temporal pooling engine 194 collaborate to predict the quality score 184 of a re-constructed target 144 based on the perceptual quality model 190, the re-constructed target 144, and a target 142. The feature extractor 140, the prediction engine 192, and the temporal pooling engine 194 are collectively referred to herein as a "prediction application." The re-constructed target 144 includes, without limitation, reconstructed video content that is derived from the video content included in the target 142. The target 142 includes, without limitation, any amount and type of video content.

The re-constructed target 144 replicates the video content included in the associated source 122 as conveyed to a viewer via a streaming infrastructure and a display device. The re-constructed target 144 may be generated in any technically feasible fashion. For instance, in some embodiments, an encoder encodes the target 142 based on a constant rate encoding strategy to generate an encoded target. Subsequently, a decoder decodes the encoded target to generate the re-constructed target 144.

For each spatial feature associated with the perceptual quality model 190, the spatial extractor 148 computes the spatial array 172 based on the re-constructed target 144 and, optionally, the target 142. For each temporal feature associated with the perceptual quality model 190, the temporal extractor 146 computes the temporal array 174 based on the re-constructed target 144 and the target 142. In this fashion, for each frame included in the re-constructed target 144, the feature extractor 140 computes a different frame value for each spatial feature and a different frame pair value for each temporal feature.

For each frame included in the re-constructed target 144, the prediction engine 192 generates a frame score based the frame values associated with the frame, the frame pair values associated with the frame, and the perceptual quality model 190. For example, for the first frame included in the re-constructed target 144, the prediction engine 192 determines a first set of values for the features based on the first entries of the spatial arrays 172 and the first entries of the temporal arrays 174. The prediction engine 192 then determines the frame score for the first frame based on the first set of values for the features and the perceptual quality model 190. In alternate embodiments, the prediction engine 192 may compute scores for perceived visual quality at any level of granularity based on values for the features at the same level of granularity and the perceptual quality model 190.

Subsequently, the temporal pooling engine 194 determines the quality score 184 of the re-constructed target 144 based on the arithmetic mean of the frame scores. More specifically, the temporal pooling engine 184 sums all of the frame scores and then divides the summation by the total number of frames to compute the quality score 184. Accordingly, the quality score 184 represents an average visual quality across the frames included in the re-constructed target 144. Finally, the temporal pooling engine 194 transmits or displays the quality score 184 of the re-constructed target 144 for evaluation of streamed video content.

In alternate embodiments, the temporal pooling engine 194 may determine the quality score 184 of the re-constructed target 144 based on the frame scores in any technically feasible fashion. For instance, in some embodiments, the temporal pooling engine 194 may perform hysteresis pooling operations that mimic the relatively smooth variance of human opinion scores in response to changes in video quality. More precisely, the temporal pooling engine 194 could perform both linear low pass operations and non linear (rank-order) weighting operations on the frame scores to generate the quality score 184 of the re-constructed target 144.

In some alternate embodiments, the temporal pooling engine 194 determines a different quality score 184 of each chunk of the re-constructed target 144 instead of a single quality score 184 for the re-constructed target 144. As referred to here, a "chunk" typically corresponds to a scene, and a scene is a sequence of frames were the spatiotemporal characteristics are approximately constant. To compute the quality score 184 of a particular chunk of the re-constructed target 144, the temporal pooling engine 194 computes the arithmetic mean of the frame scores for the subset of the frames that are included in the chunk.

One limitation of predicting the quality of re-constructed video content via a conventional perceptual quality model is that conventional perceptual quality models typically lack robustness. For example, if none of the features associated with a conventional perceptual quality model reflect certain types of distortions, then the conventional perceptual quality model is unable to accurately predict human perception of the quality of re-constructed video content that include such distortions.

A conventional perceptual quality model is typically associated with multiple spatial features and a single temporal feature. The spatial features may include without limitation, any number of additive impairment measures (ADM) features, blind or referenceless image spatial quality evaluator features, and visual information fidelity (VIF) features, to name a few. The temporal feature is a frame difference feature. For a given frame pair, a conventional temporal extractor computes per-pixel differences in luminance between the two frames. The temporal extractor then sets the frame pair value for the frame difference feature equal to the average of the per-pixel differences in luminance.

However, as demonstrated by benchmarking conducted using the public-domain LIVE Video Quality Database, the frame difference feature does not accurately measure the perceived quality degradation attributable to many types of complex temporal video distortions. Examples of complex temporal video distortions include, without limitation, motion estimation mismatches, flicker, and ghosting. Because the frame difference feature is an unreliable measure of complex temporal video distortions, conventional perceptual quality models are unable to robustly predict the perceived visual quality of re-constructed video content.

Implementing Accurate Temporal Features

To address the above problems, the system 100 establishes multiple temporal features that emulate aspects of how the human visual system processes visual information. For instance, as described in conjunction with FIG. 2, because the human visual system processes visual information at multiple scales, the temporal extractor 146 computes frame pair values for multiple temporal features, where each temporal feature is associated with a different scale. In alternate embodiments, the temporal extractor 146 may compute frame pair values for any number of temporal features in any technically feasible fashion that ensures that multiple scales are represented. In general, the temporal extractor 146 computes frame pair values for temporal features that are perceptually relevant and, together, accurately measure perceived quality degradation attributable to complex temporal video distortions.

It will be appreciated that the system 100 shown herein is illustrative and that variations and modifications are possible. For example the functionality provided by the training feature engine 130, the training engine 180, the feature extractor 140, the spatial extractor 148, the temporal extractor 146, the prediction engine 192, and the temporal pooling engine 194 as described herein may be integrated into or distributed across any number of software applications (including one) and any number of components of the system 100. Further, the connection topology between the various units in FIG. 1 may be modified as desired.

Figure 2:
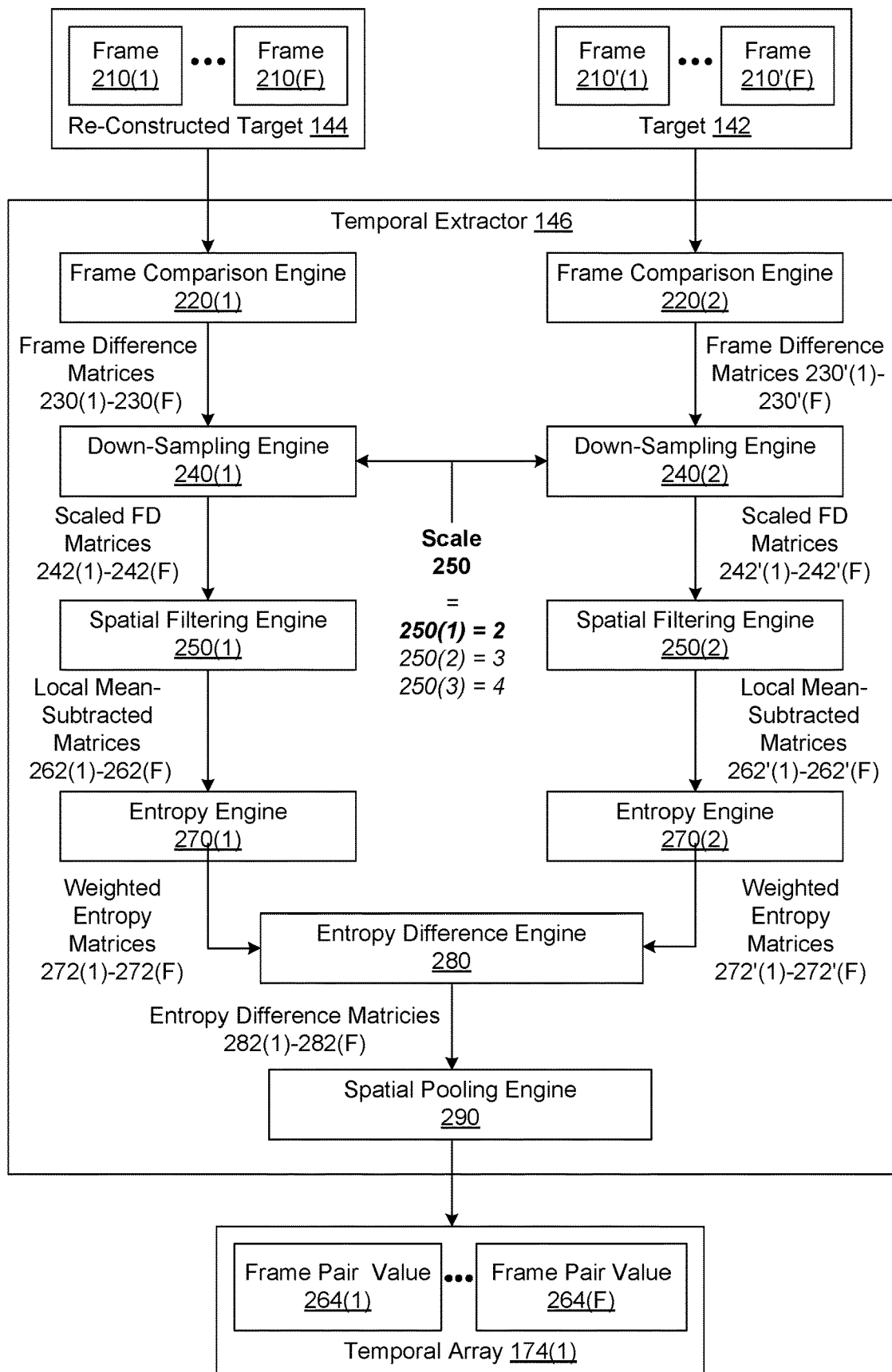
FIG. 2 is a more detailed illustration of the temporal extractor of FIG. 1, according to various embodiments of the present invention.

FIG. 2 is a more detailed illustration of the temporal extractor 146 of FIG. 1, according to various embodiments of the present invention. As shown, the temporal extractor 146 includes, without limitation, a frame comparison engine 220, a down-sampling engine 240, a spatial filtering engine 250, an entropy engine 270, an entropy comparison engine 280, and a spatial pooling engine 290.

In general, the temporal extractor 146 generates values for the temporal features of re-constructed video content based on the re-constructed video content and the video content from which the re-constructed video content is derived. Notably, each of the temporal features is associated with a different scale 250. The re-constructed video content may be any of the re-constructed sources 124 or the re-constructed target 144. For explanatory purposes only, the temporal extractor 146 is described in FIG. 2 in the context of generating the temporal array 174(1) for a first temporal feature of the re-constructed target 144.

As shown, the re-constructed target 144 includes, without limitation, frames 210(1)-210(F), where F is any integer greater than 1. In a complementary fashion, the target 142 includes, without limitation, the frames 210'(1)-210'(F). For explanatory purposes only, an object that is associated with the target 142 is distinguished from a comparable object that is associated the re-constructed target 144 with a prime symbol (i.e., ') that decorates the reference number. As described in conjunction with FIG. 1, each of the re-constructed target 144 and the target 142 are associated with F frames 210 and F frame pairs.

In operation, the frame comparison engine 220(1) computes frame difference matrices 230(1)-230(F) based on the re-constructed target 144. Each frame difference matrix 230 is associated with a different frame pair. In general, to compute the frame difference matrix 230($x$), the frame comparison engine 220(1) performs per-pixel comparison operations between the frames 210($x$) and 210($x$+1) to determine per-pixel luminance differences. Accordingly, each pixel location included in the frame difference map 230($x$) specifies a different per-pixel luminance difference. In an analogous manner, the frame comparison engine 220(2) independently computes the frame difference matrices 230'(1)-230'(F) based on the target 142.

The down-sampling engine 240(1) independently performs down-sampling operations on each of the frame difference matrices 230(1)-230(F) based on the scale 250(1) associated with the first temporal feature to generate, respectively, scaled frame difference (FD) matrices 242(1)-242(F). As shown, the scale 250(1) is equal to 2. In alternate embodiments, the first temporal feature may be associated with any scale 250 in any technically feasibly fashion. The down-sampling engine 240(1) may perform any number and type of down-sampling operations based on the scale 250(1). In general, if each of the frame difference matrices 230 includes N by M pixels and the scale 240(1) is Q, then each of the scaled frame difference matrices 242 includes N/Q by M/Q pixels. In an analogous manner, the down-sampling engine 240(2) independently performs down-sampling operations on each of the frame difference matrices 230'(1)-230'(F) based on the scale 240(1) to generate, respectively, the scaled frame difference matrices 242'(1)-242'(F).

The spatial filtering engine 250(1) independently processes each of the scaled frame difference matrices 242(1)-242(F) to generate, respectively, local mean-subtracted matrices 262(1)-262(F). To process the scaled frame difference matrix 242($x$), the spatial filtering engine 250(1) performs a two-step localized spatial filtering process that approximates bandpass filtering of the scaled frame difference matrix 242($x$). First, the spatial filtering engine 250(1) filters the scaled frame difference matrix 242($x$) with a spatial isotropic Gaussian filter to generate a locally averaged scaled frame difference matrix (not shown). The spatial filtering engine 250(1) then subtracts the locally averaged scaled frame difference matrix from the scaled frame difference matrix 242($x$) to generate the local mean-subtracted matrix 262($x$). In an analogous fashion, the spatial filtering engine 250(2) independently processes each of the scaled frame difference matrices 242'(1)-242'(F) to generate, respectively, the local mean-subtracted matrices 262'(1)-262'(F).

The entropy engine 270(1) independently performs conditioning operations on each of the local mean-subtracted matrices 262(1)-262(F) to generate, respectively, weighted entropy matrices 272(1)-272(F). Notably, the conditioning operations are related to divisive normalization process that is known to occur in the primary visual cortex (area V1). To process the local mean-subtracted matrix 262($x$), the spatial filtering engine 250(1) assigns the samples included in the local mean-subtracted matrix 262($x$) to overlapping blocks, where each block includes a b×b set of neighboring samples. The spatial filtering engine 250(1) then estimates a b×b covariance matrix based on the overlapping blocks. The spatial filtering engine 250(1) also partitions the samples included in the local mean-subtracted matric 282($x$) into non-overlapping b×b blocks. For each non-overlapping block, the spatial filtering engine 250(1) computes the variance of the non-overlapping block.

Subsequently, for each non-overlapping block, the spatial filtering engine 250(1) computes an entropy value for the non-overlapping block based on the covariance matrix. Finally, for each non-overlapping block, the spatial filtering engine 250(1) weighs the entropy value of the non-overlapping block by the variance of the non-overlapping block via a logarithmic function to compute a weighted entropy value. Accordingly, the weighted entropy matrix 272($x$) includes, without limitation, a weighted entropy value for each non-overlapping block. In an analogous fashion, the spatial filtering engine 250(2) independently processes each of the local mean-subtracted matrices 262'(1)-262'(F) to generate, respectively, the weighted entropy matrices 272'(1)-272'(F).

The entropy difference engine 280 computes entropy difference matrices 282(1)-282(F) based on the weighted entropy matrices 272(1)-272(F) associated with the re-constructed target 144 and the weighted entropy matrices 272'(1)-272'(F) associated with the target 142. More specifically, to compute the entropy difference matrix 282($x$), the entropy difference engine 280 computes the difference between each of the weighted entropy values included in the weighted entropy matrix 272($x$) and the corresponding weighted entropy value included in the weighted entropy matrix 272'($x$). Accordingly, the entropy difference matrix 282($x$) includes, without limitation, an "entropy difference value" for each non-overlapping block.

The spatial pooling engine 290 performs spatial pooling operations to generate the temporal array 174(1) based on the entropy difference matrices 282. As shown, the temporal array 174(1) includes, without limitation, frame pair values 264(1)-264(x). Each of the frame pair values 264 included in the temporal array 174(1) specifies a value for the first temporal feature of a different one of the frame pairs included in the re-constructed target 144. To compute the frame pair value 264(x), the spatial pooling engine 290 averages the entropy difference values over all the non-overlapping blocks included in the entropy difference matrix 282(x).

In alternate embodiments, the spatial pooling engine 290 may aggregate the entropy difference values included in the entropy difference matrix 282(x) in any technically feasible fashion to generate the frame pair value 264(x). Advantageously, entropy differences between re-constructed video content and the video content from which the re-constructed video content is derived correlate with subjective human assessments of the quality of the re-constructed video content.

Notably, a second temporal feature is associated with the scale 250(2) of 3 and a third temporal feature is associated with the scale 240(3) of 4. When computing the temporal array 174(2), the down-sampling engines 240(1) and 240(2) perform down-sampling operations based on the scale 240(2) of 3. When computing the temporal array 174(3), the down-sampling engines 240(1) and 240(2) perform down-sampling operations based on the scale 240(3) of 4. The operations of the frame comparison engine 220, the spatial filtering engine 250, the entropy engine 270, the entropy comparison engine 280, and the spatial pooling engine 290 are not altered based on the scale 250. Advantageously, computing temporal features at multiple scales reflects multiscale processing inherent in the human vision system.

Note that the techniques described herein are illustrative rather than restrictive, and may be altered without departing from the broader spirit and scope of the invention. Many modifications and variations on the functionality provided by the temporal extractor 146, the frame comparison engine 220, the down-sampling engine 240, the spatial filtering engine 250, the entropy engine 270, the entropy comparison engine 280, and the spatial pooling engine 290 will be apparent to those of ordinary skill in the art without departing from the scope and spirit of the described embodiments.

For instance, in various embodiments, the temporal extractor 146 may be configured to compute values for any number of temporal feature based on any of the matrices at any number of scales 250. For example, the temporal extractor 146 could compute frame pair values for a first frame difference feature based on the frame difference matrices 230 and 230'. The temporal extractor 146 could compute frame pair values for a second frame difference feature based on the frame difference matrices 242 and 242' that are associated with the scale 250 of 2. The temporal extractor could compute frame pair values for a first entropy feature based on the entropy difference matrices 282 that are associated with the scale 250 of 2. Finally, the temporal extractor could compute frame pair values for a second entropy feature based on the entropy difference matrices 282 that are associated with the scale 250 of 3.

Figure 3:
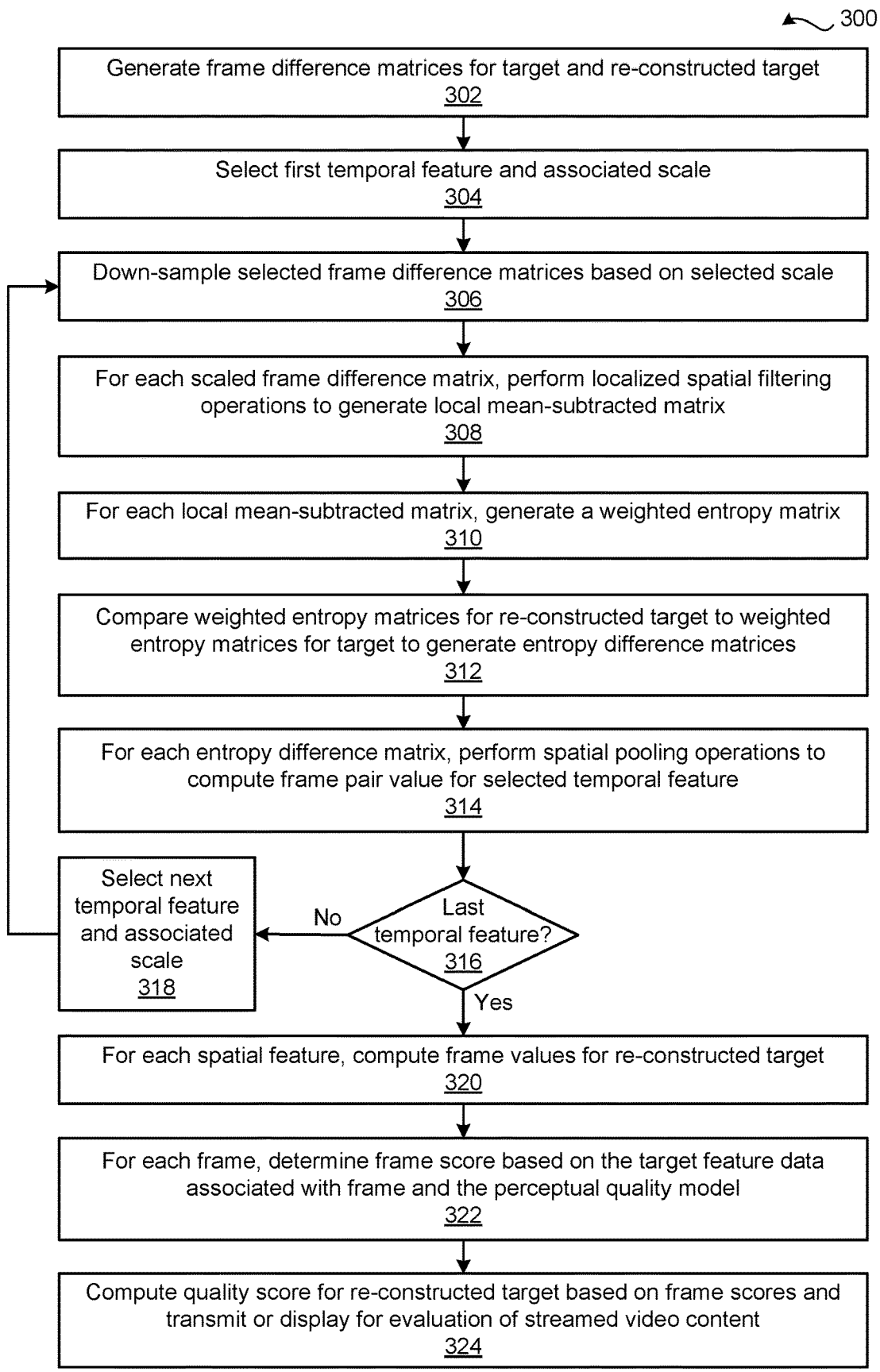
FIG. 3 is a flow diagram of method steps for computing a quality score for re-constructed video content, according to various embodiments of the present invention.

FIG. 3 is a flow diagram of method steps for computing a quality score for re-constructed video content, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the frame comparison engine 220 generates the frame difference matrices 230 based on the re-constructed target 144 and the frame difference matrices 230' based on the target 142. At step 304, the temporal extractor 146 selects the first temporal feature and the scale 250(1) associated with the first temporal feature. At step 306, the down-sampling engine 240 down-samples the frame difference matrices 230 and the frame difference matrices 230' based on the selected scale 250 to generate, respectively, the scaled frame difference matrices 242 and the scaled frame difference matrices 242'.

At step 308, for each of the scaled frame difference matrices 242, the spatial filtering engine 250 independently performs localized spatial filtering operations on the frame difference matrix 242 to generate the corresponding local mean-subtracted matrix 262. In an analogous fashion, for each of the scaled frame difference matrices 242', the spatial filtering engine 250 independently performs localized spatial filtering operations on the scaled frame difference matrix 242' to generate the corresponding local mean-subtracted matrix 262'.

At step 310, for each of the local mean-subtracted matrices 262, the entropy engine 270 performs conditioning operation on the local mean-subtracted matrix 262 to compute the weighted entropy matrix 272. In an analogous fashion, for each of the local mean-subtracted matrices 262', the entropy engine 270 performs conditioning operation on the local mean-subtracted matrix 262' to compute the weighted entropy matrix 272'.

At step 312, the entropy difference engine 280 compares the weighted entropy matrices 272 associated with the re-constructed target 144 to the weighted entropy matrices 272' associated with the target 142 to compute the entropy difference matrices 282. More specifically, to compute the entropy difference matrix 282(x), the entropy difference engine 280 computes the difference between each of the weighted entropy values included in the weighted entropy matric 272(x) and the corresponding weighted entropy value included in the weighted entropy matrix 272'(x). At step 314, for each of entropy difference matrices 282, the spatial pooling engine 290 performs spatial pooling operations to compute the frame pair value 264(x) included in the temporal array 174 associated with the selected temporal feature.

At step 316, the temporal extractor 146 determines whether the selected temporal feature is the last temporal feature. If, at step 316, the temporal extractor 146 determines that the selected temporal feature is not the last temporal feature, then the method 300 proceeds to step 318. At step 318, the temporal extractor 146 selects the next feature and the associated scale 250, and the method 300 returns to step 306, where the down-sampling engine 240 down-samples the frame difference matrices 230 and the frame difference matrices 230' based on the selected scale 250.

If, however, at step 316, the temporal extractor 146 determines that the selected temporal feature is the last temporal feature, then the method 300 proceeds directly to step 320. At step 320, for each spatial feature, the spatial extractor 146 computes frame values based on the re-constructed target 144 and, optionally, the target 142. At step 322, for each of the frames 210, the prediction engine 192 generate a frame score based on the frame values associated with the frame, the frame pair values associated with the frame, and the perceptual quality model 190.

At step 324, the temporal pooling engine 194 performs temporal pooling operations on the frame scores to determine the quality score 184 of the re-constructed target 144. The temporal pooling engine 194 may perform any number and type of temporal pooling operations to aggregate the frame scores. For instance, in some embodiments, the temporal pooling engine 194 determines the quality score 184 of the re-constructed target 144 based on the arithmetic mean of the frame scores. The temporal pooling engine 194 then transmits or displays the quality score 184 of the re-constructed target 144 for evaluation of streamed video content. The method 300 then terminates.

Advantageously, any number of the quality scores 184 may be aggregated to generate an aggregate quality score as part of evaluating the visual quality of streamed media content. For example, a dashboard application that monitors a streaming service on a daily basis can indicate the health of the streaming service based on the aggregated quality score. In general, unless a change occurs to the streaming service, the aggregated quality score remains stable. Consequently, a deviation in the aggregated quality score between a particular day and the immediately preceding day indicates a change to the streaming service (e.g., an issue or an improvement) that impacts the visual quality of the streamed media content. By contrast, if a change to the streaming service is not intended to affect the visual quality of the streamed media content, then the aggregated quality score can provide confirmation that the visual quality of the streamed media content is unaffected. For instance, if a new encode for a smart phone saves bandwidth while preserving visual quality, then the aggregated quality score remains stable while a time-weighted bitrate decreases.

In another example, an A/B test application compares a control group of streaming sessions with one or more treatment groups of streaming sessions. A treatment group differs from the control group in exactly one key parameter. The aggregated quality score indicates whether the visual quality of the streamed media content is impacted by the difference in the key parameter. For instance, if the treatment group uses a new encode and the control group uses a current encode, then the A/B test application could compare the aggregated quality score for the control group and the aggregated quality score for the treatment group. The results of the comparison indicate whether the new encode impacts the visual quality of streamed media content for the treatment groups.

Predicting Visual Quality Based on Complementary Perceptual Quality Models

As persons skilled in the art will recognize, as the number of features associated with the perceptual quality model 190 increases, the likelihood of overfitting the perceptual quality model 190 also increases. When the perceptual quality model 190 is overfit, the perceptual quality model 190 models idiosyncrasies in the training data (e.g., the objective database 150 and the subjective database 184). Consequently, an overfit perceptual quality model 190 is often unable to accurately predict the quality score 184 of re-constructed video content that is not included in the training database 120. To reduce the likelihood of overfitting a single perceptual quality model 190, some embodiments of the present invention implement multiple, complementary perceptual quality models 190.

Figure 4:
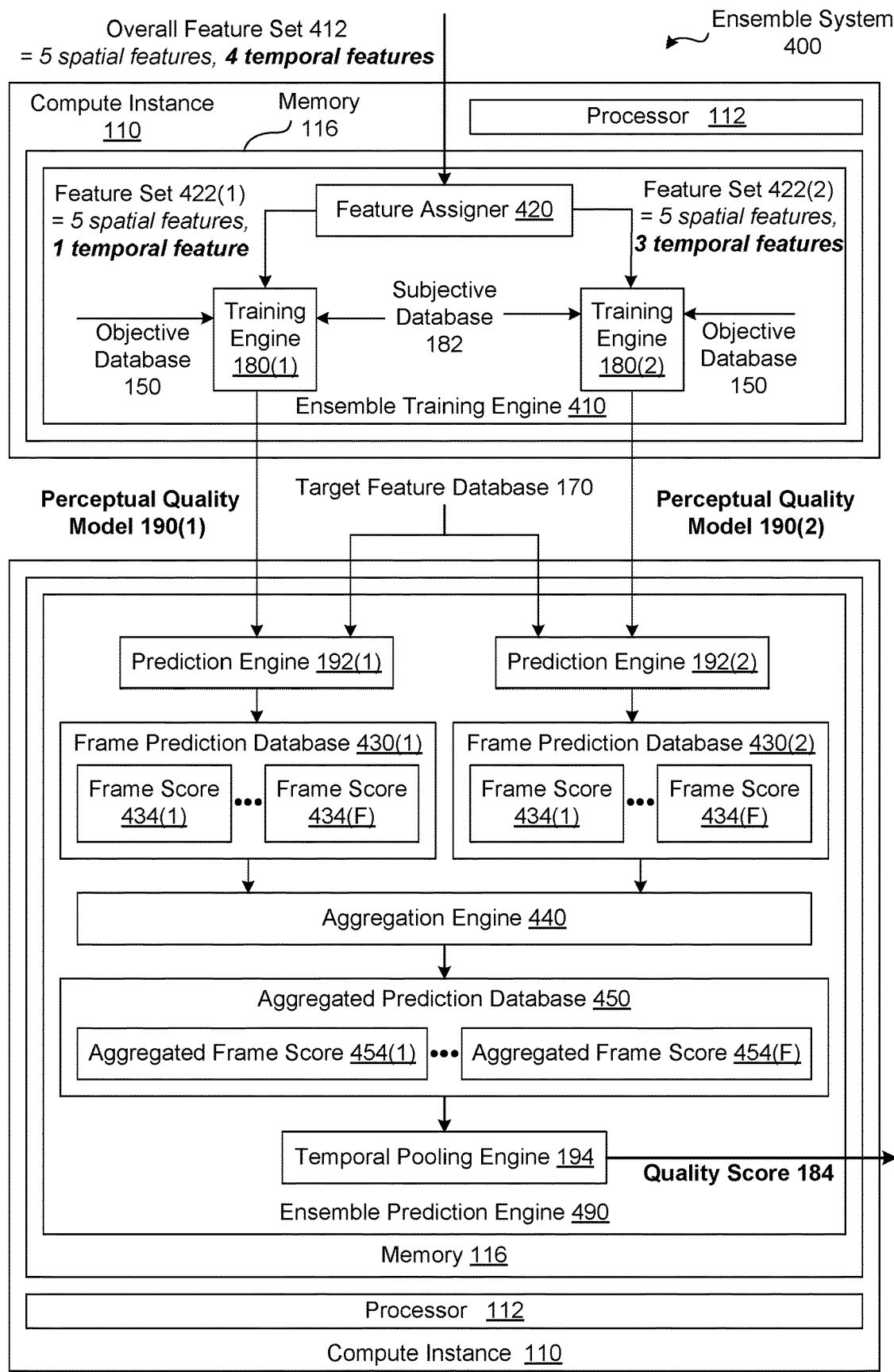
FIG. 4 is a conceptual illustration of an ensemble system configured to implement one or more aspects of the present invention.

FIG. 4 is a conceptual illustration of an ensemble system 400 configured to implement one or more aspects of the present invention. As shown, the ensemble system 400 includes, without limitation, any number of the compute instances 110. As shown, an ensemble training engine 410 resides in the memory 112 and executes on the processor of one of the computer instances 110. An ensemble prediction engine 490 resides in the memory 112 and execute on the processor 116 of another computer instance 110. In alternate embodiments, the ensemble training engine 410 and the ensemble prediction engine 490 may reside in any number and type of memories and execute on any number and type of processing devices in any combination. The ensemble prediction engine 490 is also referred to herein as an "ensemble prediction application."

The ensemble training engine 410 includes without limitation, a feature assigner 420 and two instances of the training engine 180. The feature assigner 420 receives an overall feature set 412 that includes any number of features and generates two features sets 422(1) and 422(2). More precisely, the feature assigner 420 assigns each of the features included in the overall feature set 412 to at least one of the features sets 422.

The feature assigner 420 may be configured to assign each of the features included in the overall feature set 412 to at least one of the features sets 422 in any technically feasible fashion. For example, in some embodiments, the feature assigner 420 generates the features sets 422 based on user input received via a graphical user interface (not shown). In other embodiments, the feature assigner 420 generates the feature sets 422 based on any number of heuristics that optimize any number and type of criteria.

For explanatory purposes only, the overall feature set 412 depicted in FIG. 4 includes five spatial features and four temporal features. The five spatial features include one VIF feature and four ADM features (associated with four different scales 250). The four temporal features include one frame difference feature and three entropy features (associated with three different scales 250). The feature assigner 420 assigns the five spatial features to both the feature set 422(1) and the feature set 422(2), the frame difference feature to the feature set 422(1), and the three entropy features to the feature set 422(2).

Subsequently, the ensemble training engine 410 configures the training engine 180(1) to generate the perceptual quality model 190(1) based on the subjective database 182 and the portion of the objective database 150 that specifies values for the features included in the feature set 422(1). By contrast, the ensemble training engine 410 configures the training engine 180(2) to generate the perceptual quality model 190(2) based on the subjective database 182 and the portion of the objective database 150 that specifies values for the features included in the feature set 422(2).

In alternate embodiments, the ensemble training engine 410 includes two different training engines that implement different machine learning algorithms. The ensemble training engine 410 configures the first training engine to generate the perceptual quality model 190(1) based on the subjective database 182 and the portion of the objective database 150 that specifies values for the features included in the feature set 422(1). The ensemble training engine 410 configures the second training engine to generate the perceptual quality model 190(2) based on the subjective database 182 and the portion of the objective database 150 that specifies values for the features included in the feature set 422(2).

In general, the perceptual quality model 190(1) associates a set of values for the feature set 422(1) with a first quality score, and the perceptual quality model 190(2) associates a set of values for the feature set 422(2) with a second quality score. Advantageously, because neither of the perceptual quality models 190 is associated with all of the features included in the overall feature set 422, the likelihood that the ensemble training engine 410 generates overfit perceptual quality models 190 is mitigated.

The ensemble prediction engine 490 includes, without limitation, two instances of the prediction engine 192(1) and 192(2), an aggregation engine 440, and the temporal pooling engine 194. The ensemble prediction engine 490 receives the perceptual quality model 190(1), the perceptual quality model 190(2), and the target feature database 170 associated with the re-constructed target 144. In alternate embodiments, the ensemble prediction engine 490 configures the feature extractor 140 to compute the target feature database 170.

The ensemble prediction engine 490 configures the prediction engine 192(1) to compute a frame prediction database 430(1) based on the perceptual quality model 190(1) and the portion of the target feature database 170 associated with the features included in the feature set 422(1). For each frame 210(x) included in the re-constructed target 144, the frame prediction database 430(1) includes, without limitation, a frame score 434(x) that represents a predicted perceived visual quality of the frame 210. In operation, for the frame 210(x), the ensemble prediction engine 490 determines a set of values for the feature set 422(1) based on the target feature database 170. The ensemble prediction engine 490 then configures the prediction engine 192(1) to compute the frame score 434(x) included in the frame prediction database 430(1) based on the set of values for the feature set 422(1) and the perceptual quality model 190(1).

In a complementary fashion, the ensemble prediction engine 490 configures the prediction engine 192(2) to compute the frame prediction database 430(2) based on the perceptual quality model 190(2) and the portion of the target feature database 170 associated with the features included in the feature set 422(2). In operation, for the frame 210(x), the ensemble prediction engine 490 determines a set of values for the feature set 422(2) based on the target feature database 170. The ensemble prediction engine 490 then configures the prediction engine 192(2) to compute the frame score 434(x) included in the frame prediction database 430(2) based on the set of values for the feature set 422(2) and the perceptual quality model 190(2).

Upon receiving the frame prediction database 430(1) and the frame prediction database 430(2), the aggregation engine 440 generates an aggregated prediction database 450 that includes a different aggregated frame score 454 for each of the frames 210. More precisely, the aggregation engine 440 performs any number of aggregation operations on the frame score 434(x) included in the frame prediction database 430(1) and the frame score 434(x) included in the frame prediction database 430(2) to generate the aggregated frame score 454(x) for the frame 210(x).

The aggregation engine 440 may compute the aggregated frame scores 454 in any technically feasible fashion. For instance, in some embodiments, the aggregation engine 440 computes the average of the frame score 434(x) included in the frame prediction database 430(1) and the frame score 434(x) included in the frame prediction database 430(2) to generate the aggregated frame score 454(x) for the frame 210(x). In other embodiments, the aggregation engine 440 computes a weighted average of the frame score 434(x) included in the frame prediction database 430(1) and the frame score 434(x) included in the frame prediction database 430(2) to generate the aggregated frame score 454(x) for the frame 210(x).

In yet other embodiments, the aggregation engine 440 may perform any number of machine learning algorithms to generate an aggregation model that associates a frame score 434 associated with the feature set 422(1) and a corresponding frame score 434 associated with the feature set 422(2) with the aggregated frame quality score 454. Examples of machine learning algorithms that the aggregation engine 440 may perform include, without limitation, bayes-based methods, bagging, boosting, bayesian parameter averaging, bayesian model combination, bucket of models, stacking, and the like. The aggregation model may or may not implement the same machine learning algorithms that the training engine 180 implements to generate the perceptual quality models 190. Subsequently, the aggregation engine 440 may compute the aggregated prediction database 450 that includes the aggregated frame scores 454 based on the aggregation model, the frame prediction database 430(1), and the frame prediction database 430(2).

After the aggregation engine 440 generates the aggregated prediction database 450, the temporal pooling engine 194 performs any number of temporal pooling operations on the aggregated prediction database 450 to compute the quality score 184 of the re-constructed target 144. As described in detail in conjunction with FIG. 1, some examples of temporal pooling operations include arithmetic mean operations and hysteresis pooling operations. Further, as also described in detail in conjunction with FIG. 1, in alternate embodiments, the temporal pooling engine 194 may generate different quality scores 184 for each chunk of the re-constructed target 144.

Notably, the reliability of the quality score 184 correlates to the reliability of the perceptual quality model 190(1), the reliability of the perceptual quality model 190(2), and the degree to which the perceptual quality models 190 complement each other. Accordingly, the feature assigner 420 may be configured to generate the features sets 422 based on any number of heuristics that optimize the accuracy and/or robustness of the quality score 184.

For instance, in some embodiments, the feature assigner 420 implements heuristics that optimize the features included in each of the feature sets 422 to capture spatiotemporal aspects of perceptual visual quality, result in an accurate and robust perceptual quality model 190, and are diverse within the feature set 422 as well as across the feature sets 422.

Note that the techniques described herein are illustrative rather than restrictive, and may be altered without departing from the broader spirit and scope of the invention. Many modifications and variations on the functionality provided by the ensemble training engine 410, the feature assigner 420, the training engine 180, the ensemble prediction engine 490, the prediction engine 192, the aggregation engine 440, and the temporal pooling engine 194 will be apparent to those of ordinary skill in the art without departing from the scope and spirit of the described embodiments.

Figure 5:
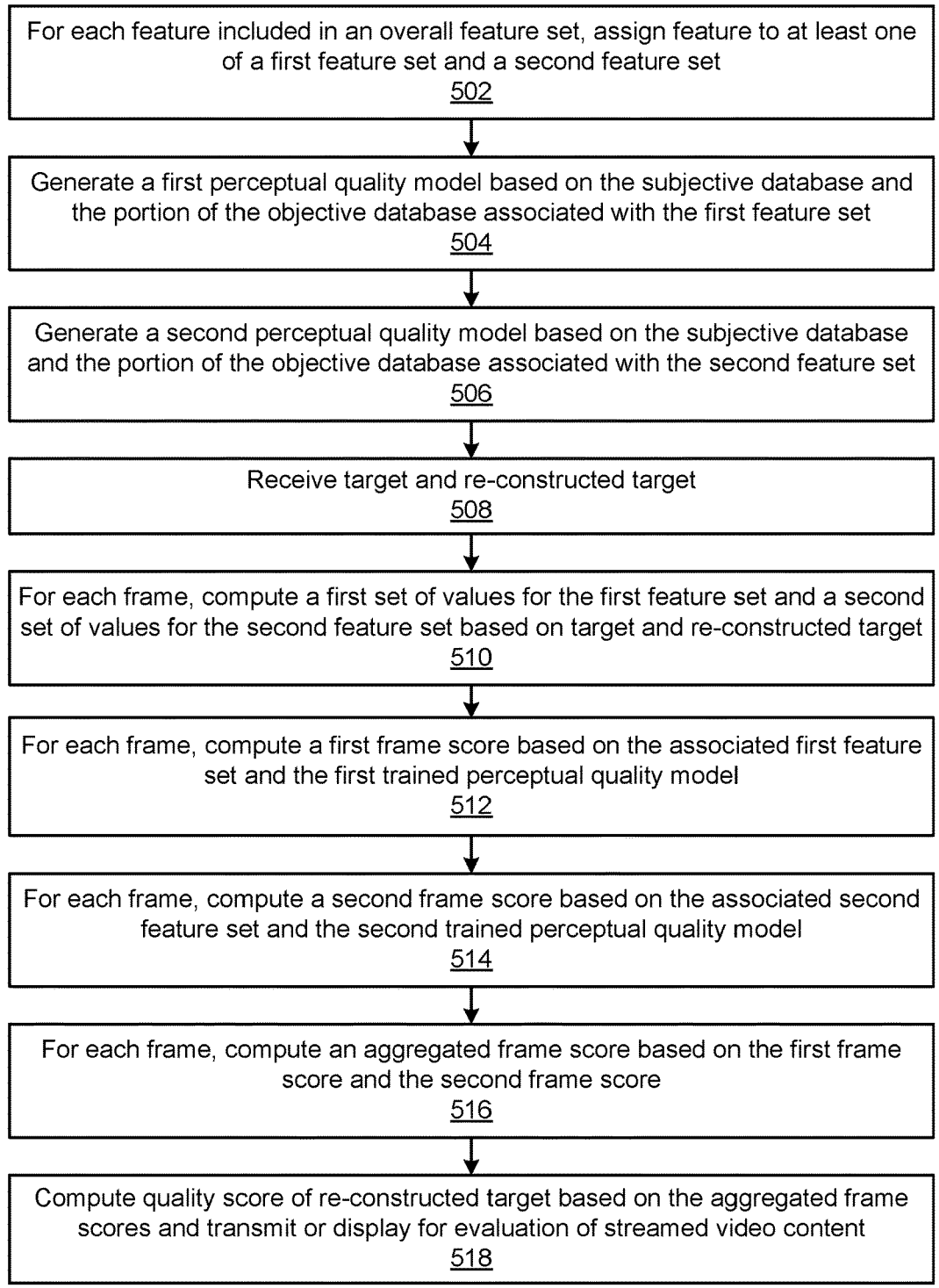
FIG. 5 is a flow diagram of method steps for computing an overall quality score for re-constructed video content based on two different sets of features, according to various embodiments of the present invention.

FIG. 5 is a flow diagram of method steps for computing an overall quality score for re-constructed video content based on two different sets of features, according to various embodiments of the present invention. Although the method steps are described with reference to the systems of FIGS. 1, 2, and 4, persons skilled in the art will understand that any system configured to implement the method steps, in any order, falls within the scope of the present invention.

As shown, a method 500 begins at step 502, where for each feature included in the overall feature set 412, the feature assigner 420 assigns the feature to at least one of the feature set 422(1) and the feature set 422(2). Notably, at least one feature included in each of the feature sets 422 is not included in the other feature set 422. At step 504, the ensemble training engine 410 configures the training engine 180(1) to generate the perceptual quality model 190(1) based on the subjective database 182 and the portion of the objective database 150 associated with the feature set 422 (1). At step 506, the ensemble training engine 410 configures the training engine 180(2) to generate the perceptual quality model 190(2) based on the subjective database 182 and the portion of the objective database 150 associated with the feature set 422(2).

At step 508, the ensemble prediction engine 490 receives the target 142 and the re-constructed target 144. At step 510, for each frame 210 included in the re-constructed target 144, the ensemble prediction engine 490 computes a first set of values for the feature set 422(1) and a second set of values for the feature set 422(2). More precisely, the ensemble prediction engine 490 configures the feature extractor 140 to compute the target feature database 170 based on the re-constructed target 144 and the target 142. For each of the frames 210, the ensemble prediction engine 490 then identifies the first set of values for the feature set 422(1) and the second set of values for the feature set 422(2) based on the target feature database 170. In alternate embodiments, for each of the frames 210, the ensemble prediction engine 490 may compute the first set of values for the feature set 422(1) and the second set of values for the feature set 422(2) in any technically feasible fashion.

At step 512, for each frame 210($x$), the ensemble prediction engine 490 configures the prediction engine 192(1) to compute a first frame score 434($x$) based on the associated set of values for the feature set 422(1) and the perceptual quality model 190(1). At step 514, for each frame 210($x$), the ensemble prediction engine 490 configures the prediction engine 192(2) to compute a second frame score 434($x$) based on the associated set of values for the feature set 422(2) and the perceptual quality model 190(2).

At step 514, for each frame 210($x$), the aggregation engine 440 computes the aggregated frame score 454 based on the first frame score 434($x$) and the second frame score 434($x$). At step 516, the temporal pooling engine 194 computes the quality score 184 of the re-constructed target 144 based on the aggregated frame scores 454 for the frames 210. The temporal pooling engine 194 may perform any number and type of temporal pooling operations to aggregate the frame scores 434. For instance, in some embodiments, the temporal pooling engine 194 determines the quality score 184 of the re-constructed target 144 based on the arithmetic mean of the frame scores 434 for the frames 210 included in the re-constructed target 144.

The temporal pooling engine 194 then transmits or displays the quality score 184 of the re-constructed target 144 for evaluation of streamed video content. The method 500 then terminates. Advantageously, as described in greater detail in conjunction with FIG. 3, any number of the quality scores 184 may be aggregated to generate an aggregate quality score as part of evaluating the visual quality of streamed media content.

In sum, the disclosed techniques may be used to efficiently and reliably predict quality scores for re-constructed video content. During a training phase, a training engine generates a perceptual quality model that maps values for features to a quality score. Subsequently, during a prediction phase, a prediction engine computes per-frame quality scores for re-constructed video content based on the perceptual quality model and values for the features of the re-constructed video content. A temporal pooling engine then composites the per-frame quality scores into a single quality score. Notably, during both the training phase and the prediction phase, a temporal extractor computes per-frame values for multiple temporal features, where each temporal feature is associated with a different scale.

The temporal extractor computes a per-frame value for a specific temporal feature based on re-constructed video content, the video content, and the scale associated with the temporal feature. To compute the per-frame value for a particular frame, the temporal extractor computes a frame difference matrix specifying differences in luminance between the frame and an adjacent frame. The temporal extractor then down-samples the frame difference matrix based on the scale to generate a scaled frame difference matrix. Subsequently, the temporal extractor performs temporal filtering operations and local mean-subtraction operations on the scaled frame difference matrix to compute a first weighted entropy matrix that is associated with the frame of the re-constructed video content. In an analogous fashion, the temporal extractor derives a second weighted entropy matrix that is associated with the corresponding frame of the video content based on the video content and the scale. The temporal extractor performs subtraction operations between the first weighted entropy matrix and the second weighted entropy matrix to compute an entropy difference matrix. Finally, the temporal extractor performs spatial pooling operations on the entropy difference matrix to generate a single frame-specific value for the feature.

In some embodiments, an ensemble prediction engine computes a quality score for re-constructed video content based on two perceptual quality models. Each of the perceptual quality models maps values for a different set of features to a different quality score. For each frame included in re-constructed video content, an ensemble prediction engine computes a first frame score based on the first perceptual quality model and a first set of values for the first set of features. For each frame included in re-constructed video content, the ensemble prediction engine computes a second frame score based on the second perceptual quality model and a second set of values for the second set of features. For each frame, the ensemble prediction engine then aggregates the first frame score and the second frame score to generate an aggregated frame score. Finally, the temporal pooling engine generates a single quality score based on the aggregated frame scores for the frames included in the re-constructed video content.

At least one technological improvement relative to prior art is that computing the entropy difference matrices at multiple scales emulates aspects of how the human visual system processes visual information. Consequently, the temporal features accurately model perceived quality degradation attributable to many types of complex temporal video distortions. Further, computing quality scores based on different perceptual quality models associated with different sets of features reduces the likelihood that increasing the total number of features results in inaccuracies attributable to overfitting.

1. In some embodiments, a computer-implemented method comprises generating a frame difference matrix based on a first frame and a second frame that are included in re-constructed video content; computing a first entropy matrix based on the frame difference matrix and a first scale; computing a first value for a first temporal feature based on the first entropy matrix and a second entropy matrix associated with both video content from which the re-constructed video content is derived and the first scale; and computing a quality score for the re-constructed video content based on the first value, a second value for a second temporal feature associated with a second scale, and a machine learning model trained using a plurality of subjective quality scores, wherein the quality score indicates a level of visual quality associated with streamed video content.

2. The computer-implemented method of clause 1, wherein computing the first entropy matrix comprises performing one or more down-sampling operations on the frame difference matrix based on the first scale to generate a scaled frame difference matrix; performing one or more spatial filtering operations on the scaled frame difference matrix to generate a local mean-subtracted matrix; and performing one or more conditioning operations on the local mean-subtracted matrix.

3. The computer-implemented method of clauses 1 or 2, wherein computing the first value for the first temporal feature comprises performing a subtraction operation between a first entropy value included in the first entropy matrix and a second entropy value included in the second entropy matrix.

4. The computer-implemented method of any of clauses 1-3, wherein computing the quality score comprises determining a first frame quality score associated with the first frame based on a plurality of values for a plurality of temporal features, one or more values for one or more spatial features, and the machine learning model, wherein the plurality of values includes the first value and the second value; and performing one or more temporal pooling operations between the first frame quality score and a second frame quality score associated with the second frame.

5. The computer-implemented method of any of clauses 1-4, wherein performing the one or more temporal pooling operations comprises performing at least one of a linear low pass operation and a non-linear rank-order weighting operation on the first frame quality score and the second frame quality score.

6. The computer implemented method of any of clauses 1-5, further comprising computing the one or more values for the one or more spatial features based on the re-constructed video content.

7. The computer-implemented method of any of clauses 1-6, wherein generating the frame difference matrix comprises, for each of a plurality of pixels, computing a luminance difference between a first luminance of the pixel in the first frame and a second luminance of the pixel in the second frame.

8. The computer-implemented method of any of clauses 1-7, further comprising training the machine learning model based on one or more machine learning algorithms and the plurality of subjective quality scores, wherein each subjective quality score included in the plurality of subjective quality scores is associated with different re-constructed test video content.

9. The computer-implemented method of any of clauses 1-8, wherein the one or more machine learning algorithms comprises at least one of a support vector machine algorithm and an artificial neural network algorithm.

10. In some embodiments, a computer-readable storage medium includes instructions that, when executed by a processor, cause the processor to perform the steps of generating a first scaled frame difference matrix based on a first frame, a second frame, and a first scale, wherein the first frame and the second frame are included in re-constructed video content; generating a second scaled frame difference matrix based on a third frame, a fourth frame, and the first scale, wherein the third frame and the fourth frame are included in video content from which the re-constructed video content is derived; computing a first entropy matrix based on the first scaled frame difference matrix; computing a first value for a first temporal feature based on the first entropy matrix and a second entropy matrix associated with the second scaled frame difference matrix; and computing a quality score for the re-constructed video content based on the first value, a second value for a second temporal feature associated with a second scale, and a machine learning model trained using a plurality of subjective quality scores, wherein the quality score indicates a level of visual quality associated with streamed video content.

11. The computer-readable storage medium of clause 10, wherein computing the first entropy matrix comprises performing one or more spatial filtering operations on the first scaled frame difference matrix to generate a local mean-subtracted matrix; and performing one or more conditioning operations on the local mean-subtracted matrix.

12. The computer-readable storage medium of clauses 10 or 11, wherein performing the one or more spatial filtering operations comprises applying a spatial isotropic Gaussian filter to the first scaled frame difference matrix.

13. The computer-readable storage medium of any of clauses 10-12, wherein computing the quality score comprises determining a first frame quality score associated with the first frame based on a plurality of values for a plurality of temporal features, one or more values for one or more spatial features, and the machine learning model, wherein the plurality of values includes the first value and the second value; and performing one or more temporal pooling operations between the first frame quality score and a second frame quality score associated with the second frame.

14. The computer-readable storage medium of any of clauses 10-13, wherein performing the one or more temporal pooling operations comprises performing at least one of a linear low pass operation and a non-linear rank-order weighting operation on the first frame quality score and the second frame quality score.

15. The computer-readable storage medium of any of clauses 10-14, wherein the one or more spatial features comprise at least one of an additive impairment measure feature, a blind or referenceless image spatial quality evaluator feature, and a visual information fidelity feature.

16. The computer-readable storage medium of any of clauses 10-15, wherein generating the first scaled frame difference matrix comprises for each of a plurality of pixels, computing a luminance difference between a first luminance of the pixel in the first frame and a second luminance of the pixel in the second frame to generate a frame difference matrix; and performing one or more down-sampling operations on the frame difference matrix based on the first scale.

17. The computer-readable storage medium of any of clauses 10-16, wherein a first subjective quality score included in the plurality of subjective quality scores is associated with one or more human-observed visual quality scores for re-constructed test video content.

18. The computer-readable storage medium of any of clauses 10-17, further comprising training the machine learning model based on the plurality of subjective quality scores and at least one of a support vector machine algorithm and an artificial neural network algorithm.

19. In some embodiments a system comprises a memory storing instructions; and a processor that is coupled to the memory and, when executing the instructions, is configured to generate a frame difference matrix based on a first frame and a second frame that are included in re-constructed video content; perform one or more down-sampling operations on the frame difference matrix based on a first scale to generate a first scaled frame difference matrix; compute a first entropy matrix based on the first scaled frame difference matrix; compute a first value for a first temporal feature based on the first entropy matrix and a second entropy matrix associated with both video content from which the re-constructed video content is derived and the first scale; perform one or more down-sampling operations on the frame difference matrix based on a second scale to generate a second scaled frame difference matrix; and compute a quality score for the re-constructed video content based on the first value, a second value for a second temporal feature associated with the second scaled frame difference matrix, and a machine learning model trained using a plurality of subjective quality scores, wherein the quality score indicates a level of visual quality associated with streamed video content.

20. The system of clause 19, wherein the processor is configured to compute the first entropy matrix by performing one or more spatial filtering operations on the first scaled frame difference matrix to generate a local mean-subtracted matrix; and performing one or more conditioning operations on the local mean-subtracted matrix.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method assessing visual quality of re-constructed video content, the method comprising:
    computing a first visual quality score indicating a first visual quality level for re-constructed video content based on a first set of values for a first set of features and a first model that associates the first set of values with the first visual quality score; and
    determining an overall visual quality score for the re-constructed video content based on the first visual quality score and a second visual quality score that is computed based on a second set of values for a second set of features and a second model that is different from the first model, wherein the second visual quality score indicates a second visual quality level for the re-constructed video content, and the second model associates the second set of values with the second visual quality score.

2. The computer-implemented method of claim 1, wherein the first model is generated via a first machine learning algorithm.

3. The computer-implemented method of claim 1, wherein the second model is generated via a first machine learning algorithm associated with the first model or a second machine learning algorithm.

4. The computer-implemented method of claim 1, wherein the first set of features and the second set of features comprise different subsets of an overall set of features.

5. The computer-implemented method of claim 1, wherein the first visual quality score and the second visual quality score are associated with a first frame included in the re-constructed video content, and determining the overall visual quality score comprises:
determining a first aggregated visual quality score associated with the first frame based on the first visual quality score and the second visual quality score; and
performing one or more temporal pooling operations on the first aggregated visual quality score and a second aggregated visual quality score associated with a second frame included in the re-constructed video content to compute the overall visual quality score.

6. The computer-implemented method of claim 5, wherein determining the first aggregated visual quality score comprises computing an average or a weighted average of the first visual quality score and the second visual quality score.

7. The computer-implemented method of claim 5, wherein determining the first aggregated visual quality score comprises associating the first visual quality score and the second visual quality score with the first aggregated visual quality score based on a third model that is generated via a first machine learning algorithm associated with the first model or a second machine learning algorithm.

8. The computer-implemented method of claim 1, wherein the first set of features includes at least one temporal feature and at least one spatial feature.

9. The computer-implemented method of claim 1, further comprising generating the first model based on a first machine learning algorithm and a plurality of subjective scores, wherein each subjective score included in the plurality of subjective scores is associated with different re-constructed test video content.

10. The computer-implemented method of claim 9, further comprising generating the second model based on the plurality of subjective scores.

11. One or more non-transitory computer-readable storage media including instructions that, when executed by one or more processors, cause the one or more processors to perform the steps of:
computing a first visual quality score indicating a first visual quality level for re-constructed video content based on a first set of values for a first set of features and a first model that associates the first set of values with the first visual quality score; and
determining an overall visual quality score for the re-constructed video content based on the first visual quality score and a second visual quality score that is computed based on a second set of values for a second set of features and a second model that is different from the first model, wherein the second visual quality score indicates a second visual quality level for the re-constructed video content, and the second model associates the second set of values with the second visual quality score.

12. The one or more non-transitory computer-readable storage media of claim 11, wherein the first model is generated via a first machine learning algorithm.

13. The one or more non-transitory computer-readable storage media of claim 11, wherein the second model is generated via a first machine learning algorithm associated with the first model or a second machine learning algorithm.

14. The one or more non-transitory computer-readable storage media of claim 11, wherein the first set of features and the second set of features comprise different subsets of an overall set of features.

15. The one or more non-transitory computer-readable storage media of claim 11, wherein the first visual quality score and the second visual quality score are associated with a first frame included in the re-constructed video content, and determining the overall visual quality score comprises:
determining a first aggregated visual quality score associated with the first frame based on the first visual quality score and the second visual quality score; and
performing one or more temporal pooling operations on the first aggregated visual quality score and a second aggregated visual quality score associated with a second frame included in the re-constructed video content to compute the overall visual quality score.

16. The one or more non-transitory computer-readable storage media of claim 15, wherein performing the one or more temporal pooling operations comprises performing at least one of a linear low pass operation, a non-linear rank-order weighting operation, or an arithmetic mean operation on the first aggregated visual quality score and a second aggregated visual quality score.

17. The one or more non-transitory computer-readable storage media of claim 11, wherein the first set of features includes a plurality of temporal features, and each temporal feature included in the plurality of temporal features is associated with a different scale.

18. A system, comprising:
one or more memories storing instructions; and
one or more processors that are coupled to the one or more memories and, when executing the instructions, are configured to:
compute a first visual quality score indicating a first visual quality level for re-constructed video content based on a first set of values for a first set of features and a first model that associates the first set of values with the first visual quality score; and
determine an overall visual quality score for the re-constructed video content based on the first visual quality score and a second visual quality score that is computed based on a second set of values for a second set of features and a second model that is different from the first model, wherein the second visual quality score indicates a second visual quality level for the re-constructed video content, and the second model associates the second set of values with the second visual quality score.

* * * * *